US008234146B2

(12) United States Patent
Mittal et al.

(10) Patent No.: US 8,234,146 B2
(45) Date of Patent: *Jul. 31, 2012

(54) METHOD AND SYSTEM FOR CONDUCTING ONLINE MARKETING RESEARCH IN A CONTROLLED MANNER

(75) Inventors: Parul A. Mittal, New Delhi (IN); Vivek Jain, New Delhi (IN); Natwar Modani, New Delhi (IN); Ravi Kothari, New Delhi (IN); Aseem Agrawal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1182 days.

This patent is subject to a terminal disclaimer.

(21) Appl. No.: 12/043,245

(22) Filed: Mar. 6, 2008

(65) Prior Publication Data

US 2008/0154707 A1    Jun. 26, 2008

Related U.S. Application Data

(62) Division of application No. 10/321,017, filed on Dec. 17, 2002, now Pat. No. 7,769,623.

(51) Int. Cl.
*G06Q 10/00* (2012.01)
(52) U.S. Cl. .................................. 705/7.29; 705/14.21
(58) Field of Classification Search .................. 705/7.29, 705/14.21
See application file for complete search history.

(56) References Cited

U.S. PATENT DOCUMENTS

| | | | |
|---|---|---|---|
| 6,112,186 A | 8/2000 | Bergh et al. | |
| 6,567,786 B1 | 5/2003 | Bibelnieks | |
| 6,714,975 B1 | 3/2004 | Aggarwal et al. | |
| 6,778,807 B1 * | 8/2004 | Martino et al. | 434/362 |
| 6,959,281 B1 * | 10/2005 | Freeling et al. | 705/50 |
| 7,016,882 B2 * | 3/2006 | Afeyan et al. | 706/13 |
| 7,058,590 B2 * | 6/2006 | Shan | 705/7.29 |
| 2002/0035568 A1 | 3/2002 | Benthin et al. | |
| 2002/0042738 A1 | 4/2002 | Srinivasan et al. | |
| 2002/0169654 A1 | 11/2002 | Santos et al. | |
| 2003/0195793 A1 * | 10/2003 | Jain et al. | 705/10 |
| 2004/0267604 A1 * | 12/2004 | Gross | 705/10 |

FOREIGN PATENT DOCUMENTS

| | | | |
|---|---|---|---|
| WO | WO-9922328 A1 | 5/1999 | |
| WO | WO 0129692 A2 * | 4/2001 | |

OTHER PUBLICATIONS

Atsuyoshi, Nakamura, "Improvements in practical Aspects of Optimally Scheduling Web Advsertising", Proceedings of the 11th International Conference on World Wide Web, May 7-11, 2002.
Bronnenberg, B.J., 1998. "Advertising Frequency Decisions in a Discrete Markov Process Under a Budget Constraint", J. Mark. Res. 35, pp. 399-406.

(Continued)

*Primary Examiner* — Jonathan G Sterrett
(74) *Attorney, Agent, or Firm* — Gibb & Riley, LLC

(57) ABSTRACT

The invention describes a method and system for conducting online marketing research keeping in consideration the specified budget for the experiment. The invention describes a methodology for effective data collection and optimised utilization of budget through the use of efficient sampling and grouping of users.

16 Claims, 9 Drawing Sheets

OTHER PUBLICATIONS

Naoki, Abe, Atsuyoshi, Nakamura, "Learning to Optimally Schedule Internet Banner Advertisements", Proceedings of the 16th International Conference on Machine Learning, pp. 12-21, Jun. 27-30, 1999.

Vijay S. Iyengar, Chidand Apte, Tong Zhang, "Active Learning Using Adaptive Resampling", Proceedings of the $6^{th}$ ACM SIGKDD International Conference on Knowledge Discovery and Data Mining, pp. 91-98, Aug. 20-23, 2000.

Danaher, P.J. and Rust. R.T. "Determining the Optimal Return on Investment for an Advertising Campaign" in European Journal of Operational Research, 1996, v95, pp. 511-521.

Holthausen, D.M. and Assmuss, G. "Advertising Budget Allocation Under Uncertainty" in Management Science, 1982, v28, n5, pp. 487-499.

Fruchter, G.E. and Kalish, S. "Dynamic Promotional Budgeting and Media Allocation" in European Journal of Operational Research, 1998, v111, pp. 167-176.

Kumar, A. Rangachari, A. Jhinigran, and R. Mohan, "Sales Promotions on the Internet", $3^{rd}$ USENIX Workshop on Electronic Commerce, Aug. 1998, pp. 167-176.

Mittal et al., U.S. Appl. No. 10/321,017, JP920020161US1, Office Action Communication, Jun. 9, 2009, 10 pages.

Mittal et al., U.S. Appl. No. 10/321,017, JP920020161US1, Notice of Allowance, Mar. 25, 2010, 4 pages.

* cited by examiner

METHOD AND SYSTEM FOR CONDUCTING ONLINE MARKETING RESEARCH IN A CONTROLLED MANNER

CROSS-REFERENCE TO RELATED APPLICATIONS

This application is a division of U.S. patent application Ser. No. 10/321,017, filed Dec. 17, 2002.

FIELD OF THE INVENTION

The present invention relates to the field of e-commerce. More particularly the invention pertains to the field of conducting online Marketing Research on a pre-defined user-base and with a specified budget.

BACKGROUND OF THE INVENTION

Marketing research enables a merchant to collect information about a product, the market, the competition and the perceptions of users.

The marketing mix is an organization's overall offer or value to the customer. The basic marketing mix is often nicknamed "the 4Ps" (product, place/distribution, pricing, promotion); these being the elements in the marketers armory— aspects that can be manipulated to keep ahead of the competition. Thus a marketing research study refers to understanding and evaluating the impact of changing the existing marketing mix, i.e. the merchant's current offer to the customer, for a particular business objective. For example, the business objective may be to test a coupon promotion. The marketing research study will comprise of offering different values of coupons to a small subset of the users, in the target user segment. The user response is measured in terms of the purchase of item being discounted for different discount values.

Some Examples of business objectives to conduct a Marketing Research are:

1. Advertisement Decisions

The merchant wants to decide on the effectiveness of some advertisements either across the user population or within a particular segment of the population. Users are selected from the specified segment(s) and are shown the advertisements a fixed number of times. The response is used to determine the effectiveness of each advertisement.

Advertisement collateral decisions: Merchant may use image-based recommendations of the different products. Each image highlights a particular attribute or feature of the product and the response to each of the images may be used to target the advertisements to a larger population.

2. Pricing Studies

The merchant is contemplating a change in price for brand X priced currently at $50. Different prices may be offered by offering coupons, discounts, free goods to customers. Let the merchant decide coupons as a mechanism of offering lower prices. Coupons of value $2, $5, $10 are offered to different users and the response of each promotion is compared to determine the price sensitivity of each segment. Users who did not respond to coupons of $2 and $5 are again offered coupons of higher value, $10. The merchant estimates the expected sales at different price points to arrive at the new price for the product. A number of coupon values are offered to different users (same as pre-testing a coupon promotion) in the same user segment and the response of each promotion is compared to determine the price sensitivity of each segment and finally, arrive at a optimum discount to be offered to the users.

3. Competitive Product Studies:

The merchant wants to measure relative cannibalization of brands B and C when a discount is offered on brand A. Brand switching studies can be conducted by offering incentives on brand A to a small set of users of brands B and C. The choice made by the users and relative profitability of brand B and brand C enables the merchant to decide the discount.

Product switching studies can be conducted by offering incentives to users who prefer a particular brand. Based on the last product purchased by the users, users may be selected and offered coupons on the competing product with similar features. Decision of the user to use the coupon to switch from his preferred product to the competing product, provides merchant about the extent of loyalty in each segment and the impact of discounts.

Online marketing-research studies can be conducted by changing the marketing mix variables and studying the impact of the change on a response variable on a user-base that is present online. Various mechanisms may be used for conducting the online marketing research experiments such as online surveys and group discussions for explicit or implicit feedback on marketing-mix changes.

To ensure that the results of the online marketing research are not influenced by factors other than the marketing mix variables being studied, it is important that the study is conducted in a controlled manner. A controlled experiment refers to the scenario where there are two sets of users, an experimental set on which the experiment is conducted and a controlled set that is subjected to exactly the same conditions as the experimental set except that they do not take part in the experiment. The idea is to compare the effect of a single variable while all other variables are fixed. In the domain of marketing mix variation experiments, it requires offering the new set of marketing mix values to a user and comparing the response with another user who has the same profile as the first user, but is not subjected to the new set of marketing mix values. For example, in the coupon promotion study mentioned above, if a user has already purchased the item being discounted, her response will be different from a user who has not purchased the item in the past. So it is important to match the response of the users who are offered the coupon against those who are not offered the coupon, such that both set of users had either purchased the item in past or not purchased it in past. Similarly, the merchant may offer two different surveys to the controlled group and the experimental group, to study and remove the bias introduced by the survey methodology. The surveys might differ in sequence of questions, sequence of response options in questions and/or the text description/images displayed for the questions.

Any marketing research experiment also has an associated budget, one or more target user segments and a time period for completion. The merchant desires to complete the experiment within the specified budget, within the defined time period and obtain the required information from one or more set of target users/customers. For example, in the coupon promotion study mentioned above, the budget could be in terms of the total discount offered to the users or the merchant may want to finish the study before the start of the Christmas season or may wish to conduct the study only on loyal customers.

The present systems for online as well as offline marketing research do not provide effective or efficient sampling of users. For instance, users having different profiles are subjected to the experiment, without first determining whether it would result in a substantial gain in the data collection. The distribution of users into different experimental and control groups is not based on their profiles and therefore the grouping is ineffective. The selection of the experiment to be administered to a user group should preferably be based on the group profile. Since existing groups consist of heterogeneous profiles such effective implementation is not feasible. Such ineffective grouping of users also prevents the comparative study of results obtained from different groups of users.

The present systems are incapable of performing meaningful sampling in situations where a predefined user base is not available. For instance, first time users randomly arriving at a website in an online marketing scenario would not be processed or grouped in any meaningful manner.

Existing systems allocate the budget in a static manner and do not take into account situations where a deterministic estimate of the budget consumed at a given point in time is not available. For instance, if coupons are issued as an incentive for participation or as a part of the market research study, the redemption rate of coupons is not known deterministically. If the system assumes that all the coupons issued would be redeemed, the system would overestimate the budget consumed. The expenditure of budget depends on the experiment being administered. Present systems do not dynamically adjust budget allocation amongst different groups and users.

U.S. Pat. No. 6,112,186 discloses a method for calculating the similarity between users and taking intelligent decisions thereof. The invention uses collaborative filtering for calculating user similarity. But the similarity thus obtained is not used to maintain control group for comparing the result of the experiment.

US Patent Application Publication No. 2002/0042738 A1 discloses an invention that uses pricing and cost function on a case to case basis. A cost based analysis approach is used to determine whether or not the experiment should be administered. However the invention does not talk about smart expenditure of the budget specified.

US Patent Application Publication No. 2002/0035568 A1 defines user profiling and campaign editing. The invention does not talk about using the user profiles for keeping a control group for the experiment and profile based administration of the experiment.

SUMMARY OF THE INVENTION

The object of this invention is to provide effective and efficient implementation of market research experiments by enabling optimal selection and grouping of users for administering the experiments.

A second object of the invention is to enable optimal deployment and utilization of the budget for the market research experiment activity.

To achieve these and other objectives and to overcome the limitations of the existing systems, this invention proposes identifying experiment parameters, determining target ideal representative profiles of users to whom the experiment should be administered, comparing each arriving user's profile with the corresponding representative profile and selecting the user for the experiment and assigning the user to an available experiment group or control group based on the match, prior to administering the experiment to a selected user.

The ideal representative user profile may already be available or may be generated dynamically base don the profiles of the users arriving at the site.

The invention also describes a system and a program product implementation of the said method.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative preferred embodiment when read in conjunction with the accompanying drawings, wherein:

DETAILED DESCRIPTION

Figure 1:
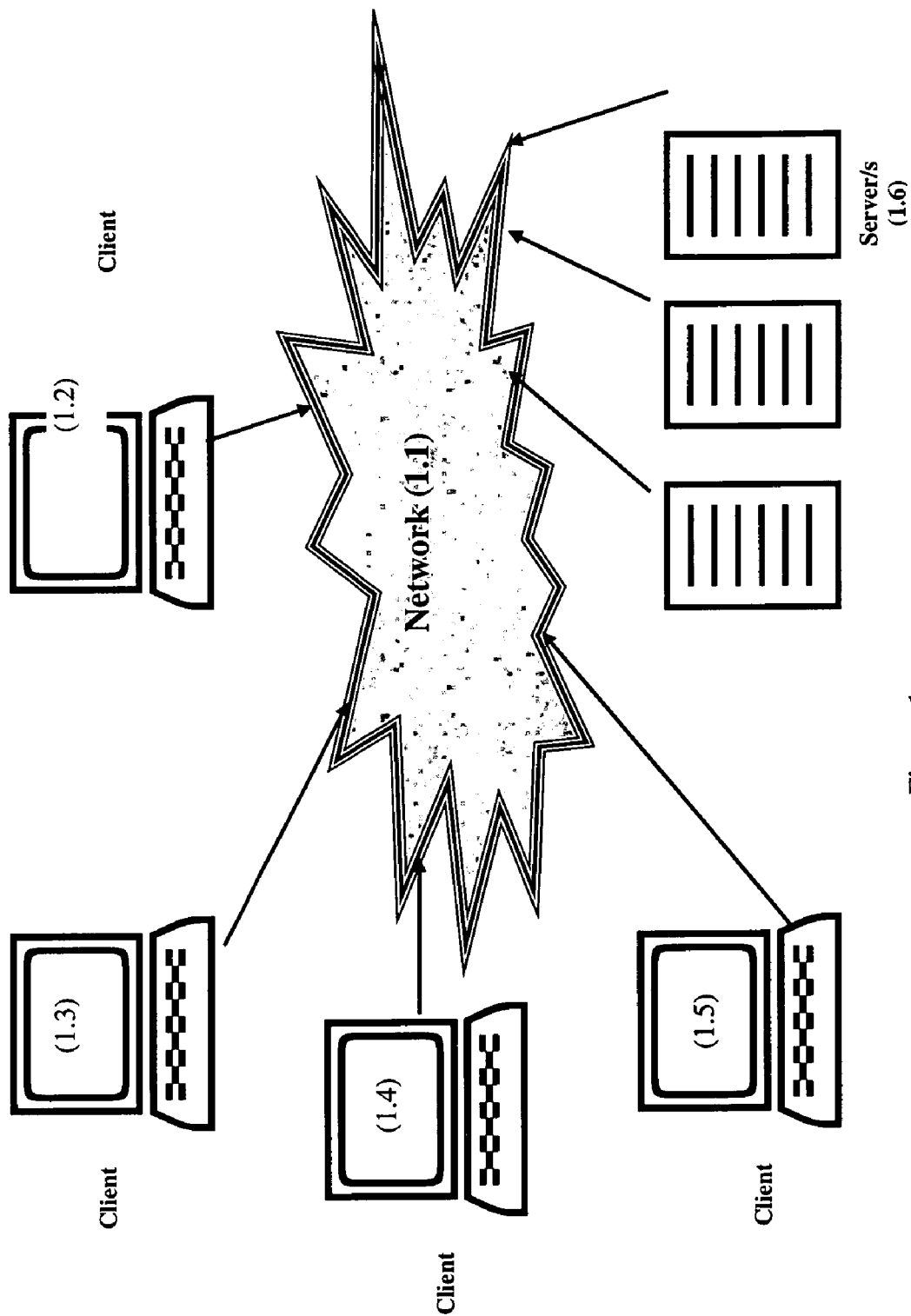
FIG. 1 shows a basic network structure comprising of the servers conducting the experiment and the clients participating in them.

FIG. 1 shows a general client-server network on which the invention might be practiced. It consists of one or more servers (1.6) connected to a network (1.1). The network and scope covers all types of networks such as Local Area Network, Internet and the like. Also present on the network are different clients (1.2, 1.3, 1.4, 1.5). The interconnection between different clients on the network is by any known communication means such as wired links, radio links or by infrared transmissions. The networking topology covers all known topologies such as star, linear, ring or a combination of any of these. The clients and the server communicate using any of the known communication protocols such as TCP/IP or Ethernet. The number of servers and the clients is not limited and the data could reside either on one server or could be distributed over a number of servers. The server (1.6) acts as the information store and clients are seekers of information sending requests to the server for information items contained therein.

The clients (1.2, 1.3, 1.4, 1.5) comprise be electronic devices such as personal computers, mobile phones, interactive televisions and the like, operated by humans or software agents operating on behalf of individuals or organizations.

Figure 2:
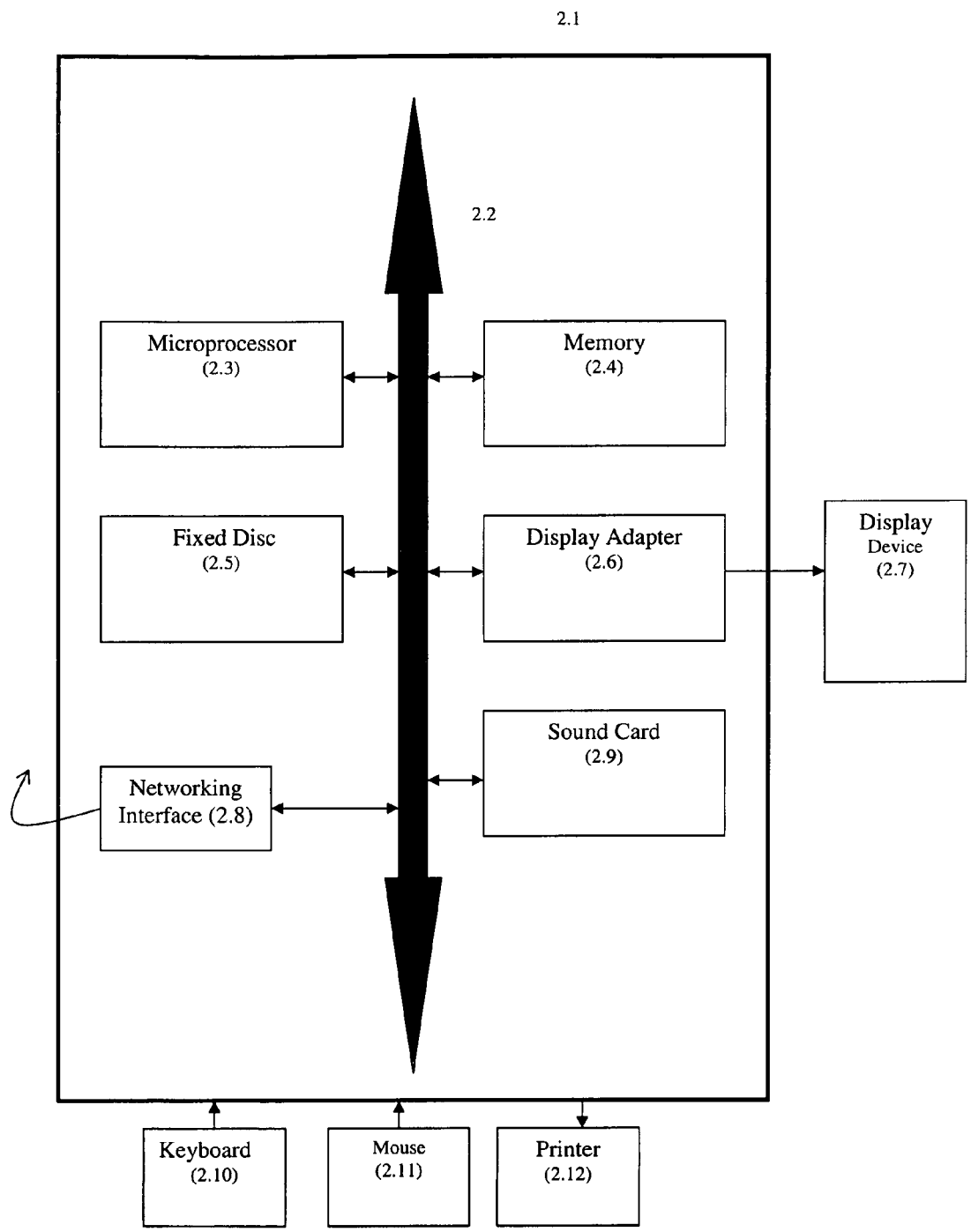
FIG. 2 depicts the internal structure of a generic computing system on which the invention might be practiced by using them as a server as well as a client.

FIG. 2 shows a block diagram of a general computing system (2.1) on which the invention might be practiced. The computer system (2.1) consists of various subsystems interconnected with the help of a system bus (2.2). The microprocessor (2.3) communicates and controls the functioning of other subsystems. The microprocessor (2.3) also acts as the control unit operating in conjunction with memory (2.4) to perform operations as defined by the stored instructions. In a general computer system the control module is any commercially available processor of which x86 processors from Intel and 680X0 series from Motorola are examples. The computing system could be a single processor system or may use two or more processors on a single system or over a network. This control module also controls the functioning of the other components of the computing system (not shown). Control module (2.3) accesses said memory (2.4) through system bus (2.2) that interconnects the various parts of the computing device. The control module executes a program called the operating system for the basic functioning of the computer system. Some examples of operating systems are UNIX, WINDOWS and DOS. These operating systems allocate the computer system resources to various programs and facilitate the interaction of users with the system. Memory (2.4) supports the microprocessor in its functioning by storing instructions and data required for program execution. Examples of memory are random access memory devices such as dynamic random access memory (DRAM) or static memory (SRAM). Storage Device (2.5) is used to hold the data and instructions permanent in nature such as the operating system and other programs. Video Interface (2.6) is used as an interface between the system bus and the display device (2.7), which is generally a video display unit such as a monitor. The network interface (2.8) is used to connect the computer with other computers on a network which can be either a Local Area Network (LAN) or a Wide Area Network (WAN) or any other type of computer network, through wired or wireless means. This networking interface can also be used to connect to the Internet. The computer system might also contain a sound card (2.9). The system is connected to various input devices like keyboard (2.11) and mouse (2.12) and output devices like printer (2.13), through an input/output Interface (2.10). Various configurations of these subsystems are possible. It should also be noted that a system implementing the present invention might use less or more number of the subsystems than described above.

In the preferred embodiment of the invention, the instructions are stored on the storage device (2.5) in the form of a computer program. This program contains coded instructions for different algorithms described herein the specification. On running the program, the instructions are transferred to the memory (2.4) and the microprocessor (2.3) executes the instructions. The system can be manually controlled by giving instructions through means of input devices such as keyboard (2.11) and mouse (2.12). Instructions, whether from the program or from the user input reside in the memory (2.4) and are subsequently acted upon by the microprocessor (2.3). It should be understood that the invention is not limited to any particular hardware comprising the computer system or the software running on it.

Those of ordinary skill in the art will appreciate that the various means for generating service requests by the clients and their processing by the server are computer programs. These programs are capable of existing in an embedded form within the hardware of the system or may be embodied on various computer readable media. The computer readable media may take the form of coded formats that are decoded for actual use in a particular information processing system. Computer program means or a computer program in the present context mean any expression, in any language, code, or notation, of a set of instructions intended to cause a system having information processing capability to perform the particular function either directly or after performing either or both of the following:

a) conversion to another language, code or notation b) reproduction in a different material form.

The depicted example in FIG. 2 is not meant to imply architectural limitations and the configuration of the incorporating device of the said means may vary depending on the implementation. Any kind of computer system or other apparatus adapted for carrying out the means described herein can be employed for practicing the invention. A typical combination of hardware and software is a general purpose computer system with a computer program that when loaded and executed, controls the computer system such that it carries out the means described herein. Other examples of the incorporating device that may be used are notebook computers or hand held computers, PDAs etc.

The proposed system comprises of an offline and an online component. The offline component doesn't require the user's presence on the web site. The first step in the offline process is the specification of the experiment parameters by the merchant. The parameters comprise, inter alia, the user selection criteria, the experiment details such as the marketing variables to be tested or the survey to be administered and the user response variables to be measured, the time period for the experiment, the smart sampling parameters, the matching parameters and the experiment budget. Next the system determines if any part of the specified user selection criteria can be processed in the offline mode, for example, checking a registered user's past traversal history, past transactions and demographic information. It checks the existing user profiles against the criteria and marks the users that satisfy the offline portion of the user selection criteria. When a user visits the web site, the system may or may not be able to associate the user with any of her previous visits. The possible ways in which a system can associate the user with her previous visits is by login, cookies on user's system etc. If the user can be associated with her previous visits, then she must satisfy the offline selection criteria to be evaluated further by the online component. Otherwise, the user is checked only against the online selection criteria e.g., the user clickstream during the session, and other user activities like shopping, browsing, chatting. The merchant can configure the user parameters, distance measures, comparison techniques and selection rules.

When a user visits the web site, the system determines if the budget allows an online experiment to be conducted. If the system decides that an experiment can be conducted on the user, the budget available flag is set to true. This is required to conduct the experiment within the specified budget. As the user browses the web site, certain user actions may trigger an event to notify the system that the user satisfies the online user selection criteria. This allows the merchant to target the experiment only to the desired user segment. Note that this event is not triggered if the budget available flag is false. In response to the event, the system determines if the user is indeed a good candidate for conducting the experiment. The measure of 'goodness' can be defined in terms of the possible information gain from the user, given the current state of the system. This smart sampling tries to gain the maximum information from a minimum number of users so as to minimize the cost and the total time required to complete the experiment. If the user is identified as a good candidate for offering the experiment, the system checks if the user matches to a previous participant. In case the current user matches to a previous participant, the user may be classified to belong to one of the experimental group(s) or the controlled group to which a matched user does not belong. For illustration, let there be 3 experimental groups, A, B, C and 1 controlled group, D in the marketing research study. If a user X matches an previous user Y who belongs to experimental group B, the user X may be assigned to either A, C or D. Let X be assigned to D. Now, if another user Z matches X and Y in terms of user features, the system may assign Z to either of the remaining matched groups, i.e., either A or C.

If the user is assigned to the controlled group, no experiment may be offered to the user but the user response is measured. Alternatively, if the merchant has defined an experiment for the users belonging to the controlled group, that experiment might be offered to the user and response collected. In case the user is assigned to one of the experiment group(s), the experiment specific to the experimental group may be offered to the user and response collected.

If the user is classified to belong in the experimental group, the experiment is offered to the user and the response is recorded. The experiment offering and the response measurement are based on the merchant specified marketing variable and user response variable parameters. The last step makes sure that the experiment is conducted in a controlled fashion.

Figure 3:
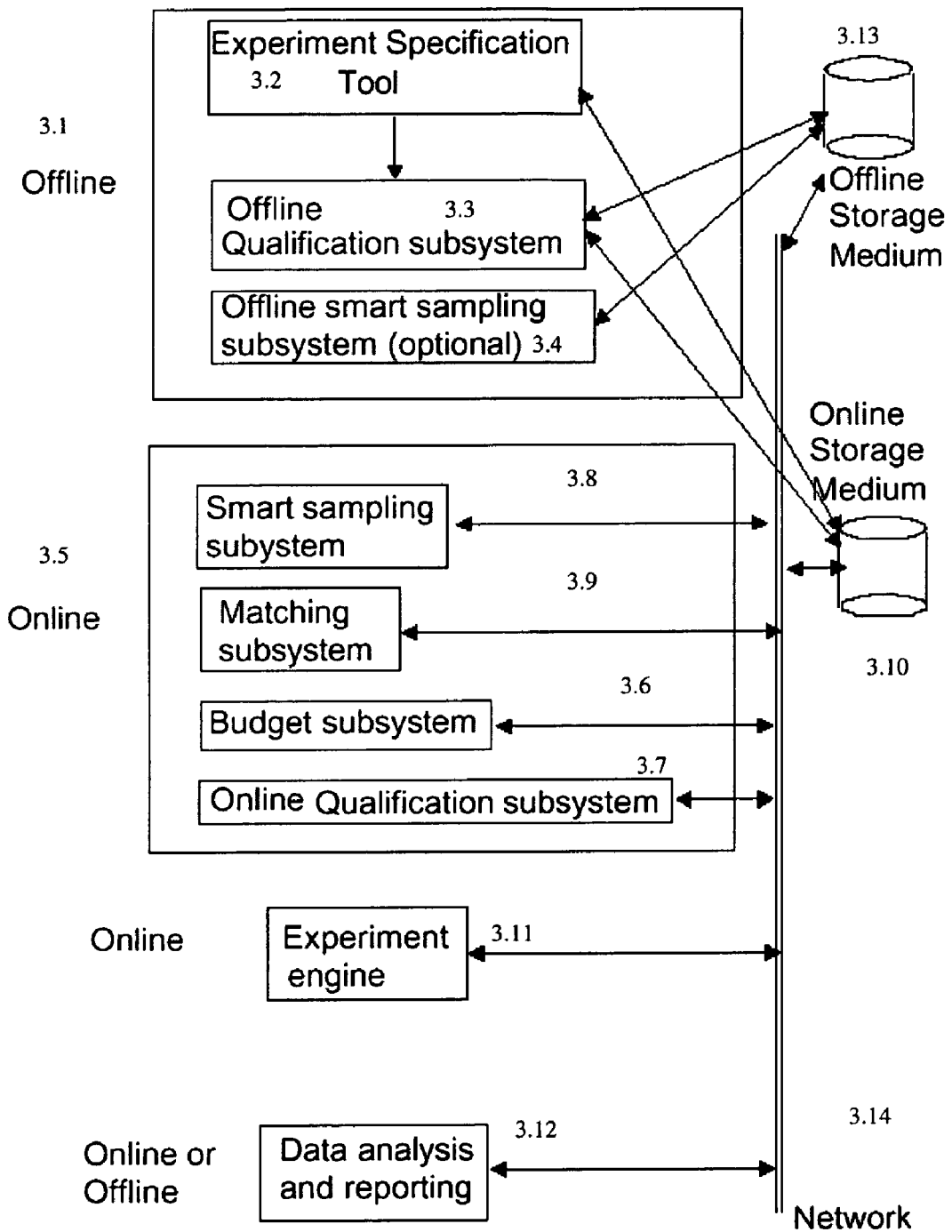
FIG. 3 shows the various components of the system.

FIG. 3 shows the various components of the system. The offline part (3.1) comprises of an experiment specification tool (3.2), an (optional) offline qualification subsystem (3.3) and an (optional) offline smart sampling subsystem (3.4). The online component (3.5) comprises of a budget subsystem (3.6), an online qualification subsystem (3.7), a smart sampling subsystem (3.8), a matching subsystem (3.9), an online storage medium (3.10) and an experiment engine (3.11). The data analysis and reporting tool (3.12) can be offline as well as online. The offline qualification subsystem and the smart sampling subsystem may do computation intensive operations on the user's past transaction data, traversals and other user features. To avoid any performance hits during the online process, these computations may be done from an offline storage medium (3.13). The offline storage medium can communicate to the online storage medium if required. All the said components communicate to each other through the means of the network as explained in FIG. 1.

Figure 4:
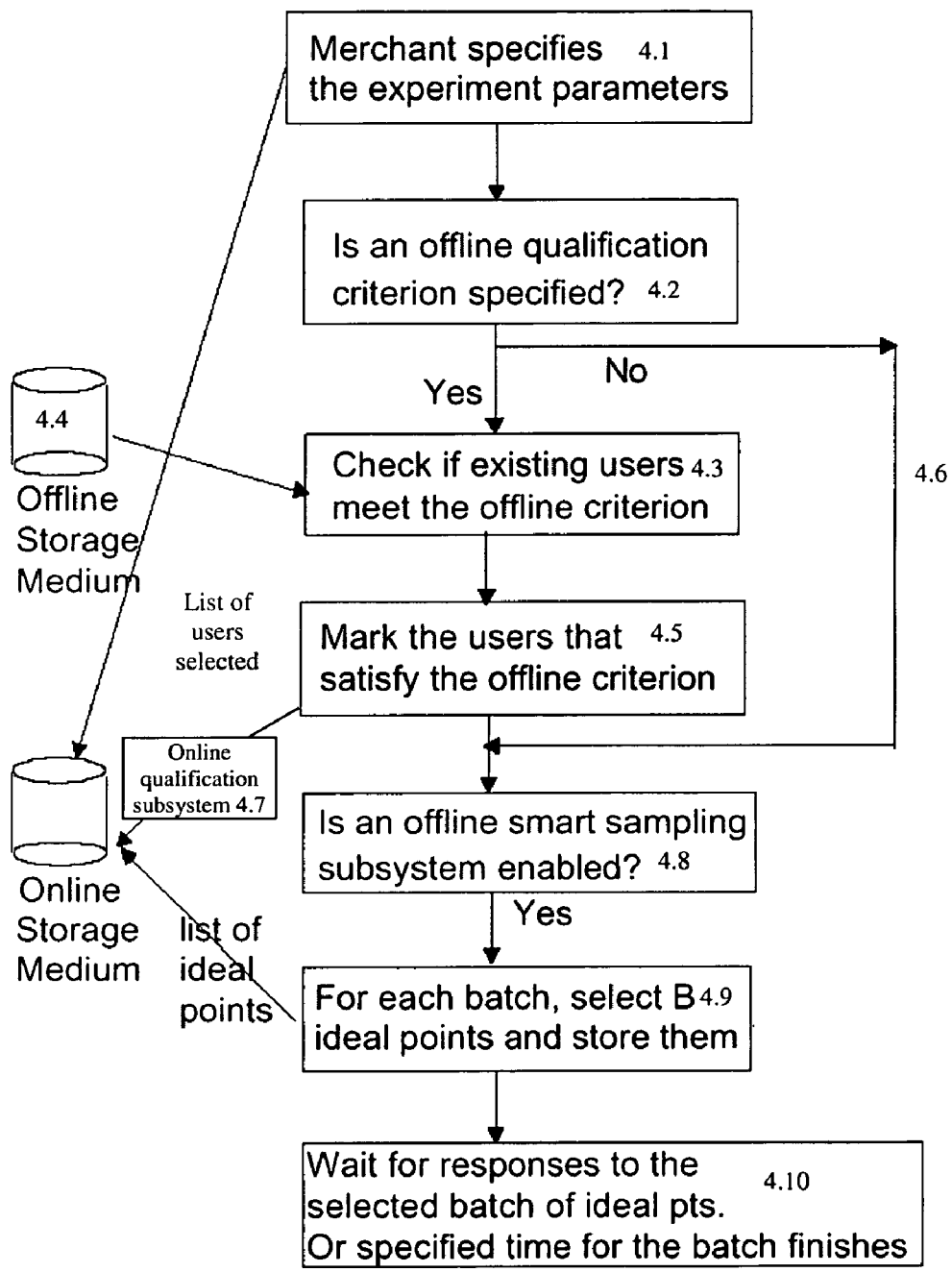
FIG. 4 shows the flowchart for the offline process.

FIG. 4 shows a flowchart for the offline process. The first step is the specification of the experiment parameters by the merchant (4.1). The parameters comprise, inter alia, the user selection criteria, the marketing variable to be tested, the user response variable to be measured, the time period for the experiment and the experiment budget. Thereafter it is checked whether any offline qualification criteria are specified (4.2). If yes then the next step is to determine if any existing users meet the user selection criteria (4.3). The user selection criteria may comprise of an offline criterion/criteria based on the user's past purchases, demographics, past clickstreams, etc. and/or an online criteria based on the user's clickstream. The offline qualification subsystem (of FIG. 3) checks the existing user profiles stored in the offline storage medium (4.4) against the offline criteria and marks the existing users (4.5) that satisfy the offline portion of the user selection criteria. When a user visits the web site, the online qualification subsystem (of FIG. 3) checks if the user meets the online selection criterion (4.7). The system may or may not be able to associate the user with any of her previous visits. The possible ways in which a system can associate the user with her previous visits is by login, cookies on user's system etc. If the user can be associated with her previous visits, then she must satisfy the offline selection criteria (4.3) to be evaluated further by the online process. Otherwise (4.6), the user is checked only against the online selection criteria (4.7) e.g., the user clickstream during the session. If no offline criterion is specified, no offline qualification is done and all the users are checked only against the online process.

Figure 5:
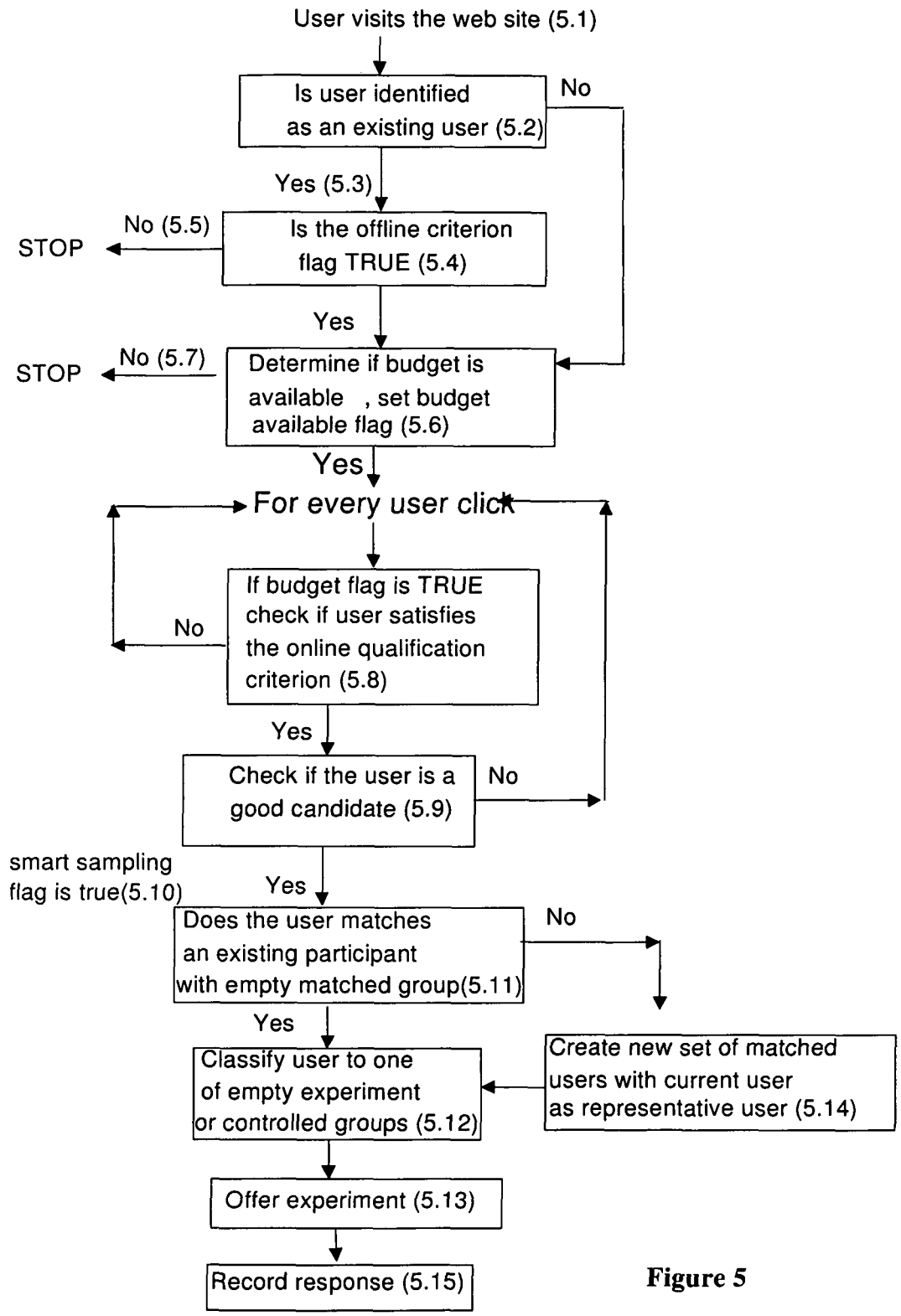
FIG. 5 is a flowchart for the online process.

The offline smart sampling subsystem, if enabled (4.8), selects the ideal representative profiles that provides the maximum expected information gain (4.9). The merchant may do the selection of ideal representative profiles in batches. The selection of ideal representative profiles is done for each batch. The online smart sampling subsystem compares the features of online users with the stored features of the ideal representative profiles and if the distance of the current online user is within a threshold distance from the ideal representative profiles for selection, the experiment may be offered to the current user and response stored. Once the offline subsystem gets the response to all the ideal representative profiles, or a specified time limit is exceeded (4.10), it incorporates these response in the sampling for the next batch. This allows the system to dynamically choose the ideal representative profiles. Once all the batches have been evaluated, the merchant is informed about the completion of the experiment FIG. 5 shows a flowchart of the online process. As a user visits the web site (5.1), the user may be identified as an existing user (5.2). In case the user is identified as an existing user (5.3), the system checks if the offline qualification satisfaction flag is true or not (5.4). In case the flag is set to 'No' then the process stops (5.5). The remaining process is followed only for the user whose flag is true; otherwise the user just browses the site normally. In case the user is a new user or has not yet been identified as an existing user, the remaining process is followed for the user. The budget subsystem determines if budget is available to conduct an online experiment on the user (5.6). If the budget subsystem decides that an experiment can be conducted for the user, the budget available flag is set to true. As the user browses the web site, certain user actions may trigger an event to notify the system that the user qualifies the online user selection criteria for offering the experiment (5.8). This event is not triggered if the budget is not available (5.7). The system responds to the online criteria satisfaction event by invoking a query on the smart sampling subsystem. The purpose of this query is to determine if the user is indeed a good candidate for conducting the experiment (5.9). The measure of 'goodness' can be defined in terms of the possible information gain from the user, given the current state of the system. If the user is identified as a good candidate for offering the experiment, and the smart sampling flag is true (5.10), the matching subsystem determines the user's experimental group. The matching subsystem checks if the user matches to a previous participant with a vacant matched group (5.11). If the user doesn't match a previous participant, a new profile ID for the new matched set of users is created with the user features of the current user (5.14). The user may be classified to one of the vacant experimental group(s) or the controlled group (5.12) and accordingly experiment is offered or not offered to the user (5.13) and the user response is measured (5.15). The experiment engine (of FIG. 3) conducts the experiment on the selected participant by changing the marketing mix variables in the manner as determined by the matching subsystem or offering the multiple surveys associated with each of the matched groups and measures the response.

The response variables to be collected are provided by the experiment specification tool.

The data is compared with historical information (for historic comparison studies); else the statistics for response variables across the controlled group and the experiment groups are reported through a GUI.

The various subsystems involved above are explained below in detail:

Experiment Parameter Specification Tool

Figure 6:
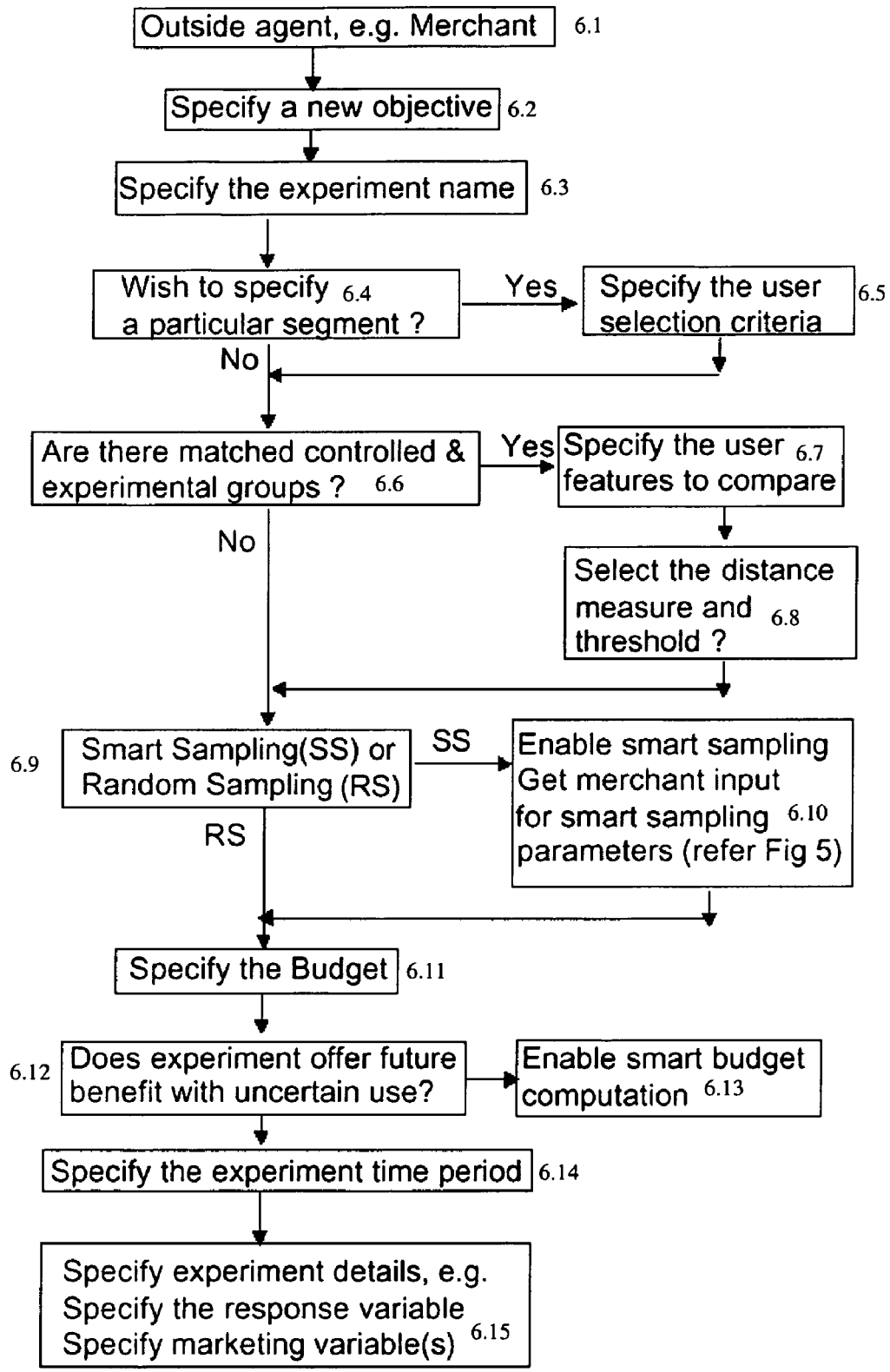
FIG. 6 is a flowchart for the experiment parameter specification process.

FIG. 6 shows the details of the experiment parameter specification process. The experiment specification tool allows the merchant (6.1) to describe the business objective for which the experiment is being conducted. The order of specification of parameters may or may not be the same as shown in FIG. 6. FIG. 6 shows one instance of the process.

There could be a predefined list of objectives that the merchant can select from or the merchant can specify a new objective (6.2), which would be added to the list of existing objectives. If the merchant chooses to specify a new objective (6.2), the merchant has to first name the experiment (6.3) specify various parameters such as the user selection criteria, the experiment details such as the marketing variable to be tested and the user response variable to be measured, the time period for the experiment, the smart sampling parameters, the matching parameters and the experiment budget. For different types of experiments, the merchant needs to provide specific details for the experiment. For example, for pricing experiments, the coupon promotion details including values of the coupons to be offered, their expiry time, redemption conditions etc. For catalog reordering experiments, the category page on which products have to be reordered and the sequence in which they shall be displayed. For explicit experiment or surveys, the set of questions to be asked, the choice types and the labeling of the response choices, the sequence in which questions shall be asked or the sequence in which the response choices shall be displayed. A set of predefined surveys with templates can also be offered wherein the merchant provides the parameters specific to the templates.

If the merchant wishes to specify a particular user segment (6.4), the user selection criteria has to be specified (6.5) which may comprise of an offline and/or online criteria. The user selection criteria can be based on the user's past purchases, user's registration information (including demographics, interests, other personal information volunteered at the time of registration), user's current session clickstream, user's previous session's clickstream history, past usage of coupons, response to advertisements, product recommendations, history of merchant defined events triggered during previous visits. The merchant may have defined a set of events and whether those events occurred during the user's previous visit or it could be stored as part of user's profile. The merchant specifies which one (or their combination) of these criteria she/he wants to use for user selection and then defines conditions on each of these criteria. The offline criteria may be used to preselect a subset of registered users.

The matching parameters refer to the data required by the matching subsystem (6.6). The merchant selects the user features (6.7) that are to be used for comparing two users. A set of predefined distance measures is available for merchant selection. The merchant also selects a threshold on this distance within which two users can be considered to be in close proximity to each other (6.8).

The merchant specifies whether to use smart sampling or random sampling (6.9). For random sampling, the merchant specifies the sampling percentage. If merchant chooses smart sampling (explained in FIG. 7) instead of random sampling, additional parameters related to smart sampling are sought from the merchant or an outside agent (6.10).

The merchant specifies the budget in terms of a monetary value or as a limit on the number of participants (6.11). The merchant may also enable smart budget computation (6.13), as in case of an experiment in which the user is offered an object which promises certain value of benefit in the future (6.12), the remaining budget available for utilization is not deterministic. In this invention, we propose the use of prediction tools to have a near accurate and real-time estimate of the remaining budget. This determines the sample size of users to which the experiment should be offered based on the past user responses.

The merchant further specifies the experiment time period (6.14) that can be specified as a start date/time and an end date/time. This is used by the various online process components to ensure that the experiment is conducted within the time period.

Depending on the experiment, the merchant can specify (select) a plurality of marketing variables (6.15) such as the price of a product, discount to be offered on a category, a new service advertisement, testing a product bundle, product design or packaging. The business objective of the experiment thus specified is to study the impact of a change in Marketing Variable(s) on selected user with respect to a response variable(s) given the control parameters. Response variables refer to the variable that is observed or measured as the response to the experiment. Examples of response variables could be revenue, product purchase, user brand switching, ad click through rate, coupon acceptance rate etc.

The Offline Qualification Subsystem

The offline qualification subsystem preselects a set of users who meet the offline user selection criteria/criterion as specified by the merchant. The offline qualification criterion can be defined based on registered users information. Each user for whom the features are stored in the offline storage medium is checked, if the user meets the offline selection criterion. The qualifying user identifiers and relevant user information is stored in the online storage medium for online application.

Online Storage Medium

The online storage medium may be in the form of rules, database tables, XML or text files. In case of rules being the storage mechanism, the rules are applied through an online rule engine. Otherwise each tools may use online code fragments for example, applets, and servlets to retrieve information from the online storage medium, process it and store the outcome back to the storage medium. Alternatively, each tool may pass text, html, code or XML files to each other containing the information required which may be stored in the online memory.

Budget Subsystem

The role of budget subsystem is to decide if the available budget permits offering of the experiment to a user visiting the web site, before doing any further qualification checks on the user. Each experiment has an associated cost and this cost is compared with the available budget, if the cost is less than the budget, then, the budget available flag is set to TRUE. This may involve a simple check on budget availability or a more complex check. A complex check is required (if smart sampling is enabled as shown in FIG. 6) where the cost of the experiment depends on the user's response subsequent to the experiment e.g., if the experiment comprises of offering an e-coupon to the user, the cost depends on whether the user accepts the coupon and further redeems it. The budget availability determination is not straightforward as it is hard to determine if the user will eventually redeem the coupon or not, even though the system knows if the last user who accepted the coupon, redeemed it or not. In such cases the budget subsystem can learn from the past user actions and do intelligent predictions from them for the current user. A number of reinforcement and supervised learning and prediction algorithms like linear regression, neural networks, decision tree etc. can be used to predict the final redemption rate and hence, the budget utilization. The prediction algorithms may use the user specific features including, but not limited to, demographics, past purchases, psychographics, clickstream, survey responses, advertisement and coupon response history and other derived or related features to learn the redemption rate.

In an experiment in which the user is offered an object which promises certain value of benefit in the future, the remaining budget available for utilization is not deterministic. In this invention, we propose the use of prediction tools to have a near accurate and real-time estimate of the remaining budget. This determines the sample size of users to which the experiment should be offered based on the past user responses.

As explained in the matching subsystem, a user is assigned to one of the vacant experimental or control group(s). The cost of conducting an experiment can be different for each of the experimental or control group(s) depending on what experiment is conducted for that specific group. In such an instance, the budget available is checked after the current user has been assigned to the group.

The Online Qualification Subsystem

The online qualification subsystem takes into account user features which are real-time or can be determined only in real-time e.g., user's click on a particular product or category or user's addition of an item to the shopping cart. For new users or unregistered users, who have not visited the site or users about whom no previously stored information is available, the qualification subsystem uses online criteria to select them. For users who can be associated with their previous history, the online qualification subsystem checks only the users that satisfy the requirement of the Offline qualification system. For example, the online qualification subsystem may select users who have traversed a particular path in their clickstream behavior or those users who are at a certain distance away from prototypical clickstream that the merchant defines. The selected users may be a subset of users selected by the Offline qualification subsystem or the outcome of Offline qualification subsystem may be re-computed in real-time based on the inputs received by the Online qualification subsystem. The recomputation may be done, as there may be time gap between the offline qualification check and the online check. There exists a possibility that a user who didn't satisfy the criteria earlier satisfies it now. The online qualification subsystem receives user specific information from the online storage medium and sets the FLAG to be TRUE if the user meets the online qualification criteria.

Smart Sampling Subsystem

Figure 7:
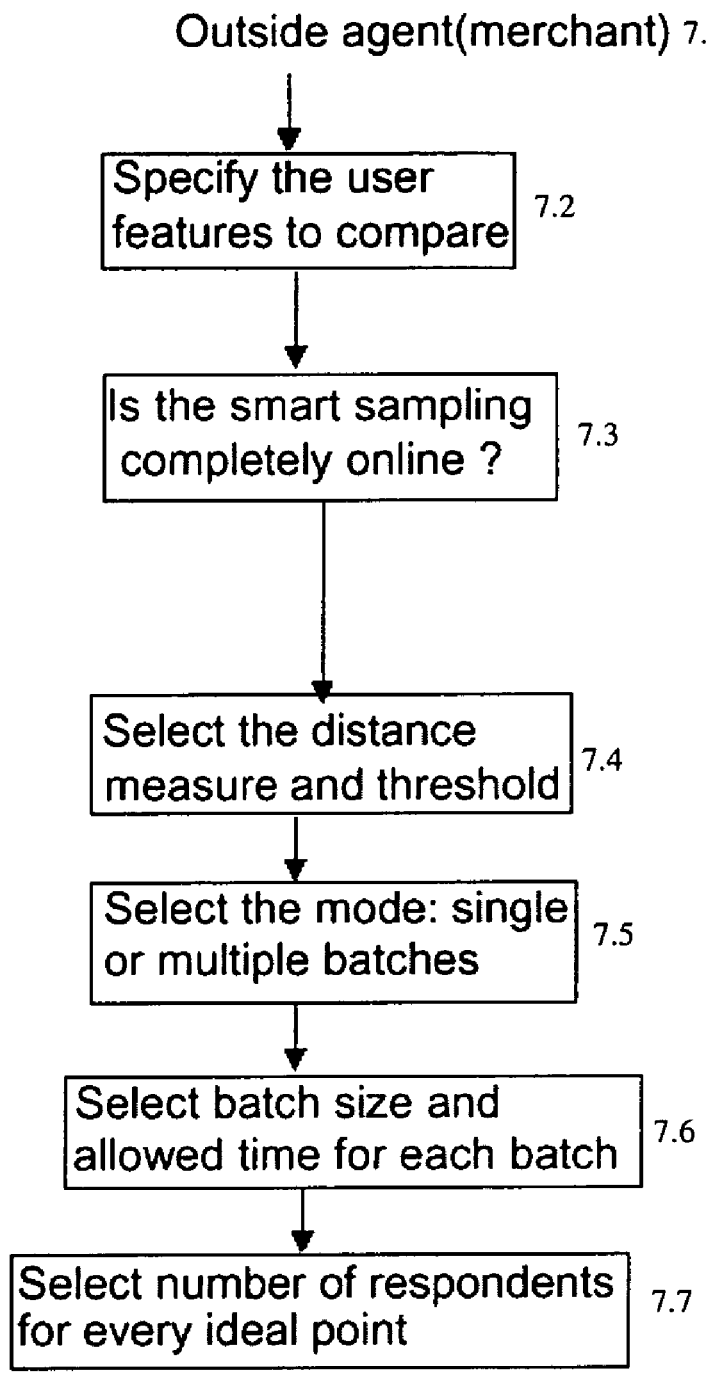
FIG. 7 depicts the flow of process involved while specifying the smart sampling parameters.

FIG. 7 is a flowchart that depicts the smart sampling parameter specification by the merchant or an outside agent (7.1). The merchant or the agent specifies the user features to compare (7.2). If the smart sampling is completely online (7.3) then the distance measure and threshold is calculated (7.4) which is followed by selecting the mode for batches which could be single or multiple batches (7.5). Thereafter the batch size and the time allocated to each batch is selected (7.6) and finally the number of respondents desired for every representative profile is specified (7.7)

Figure 8:
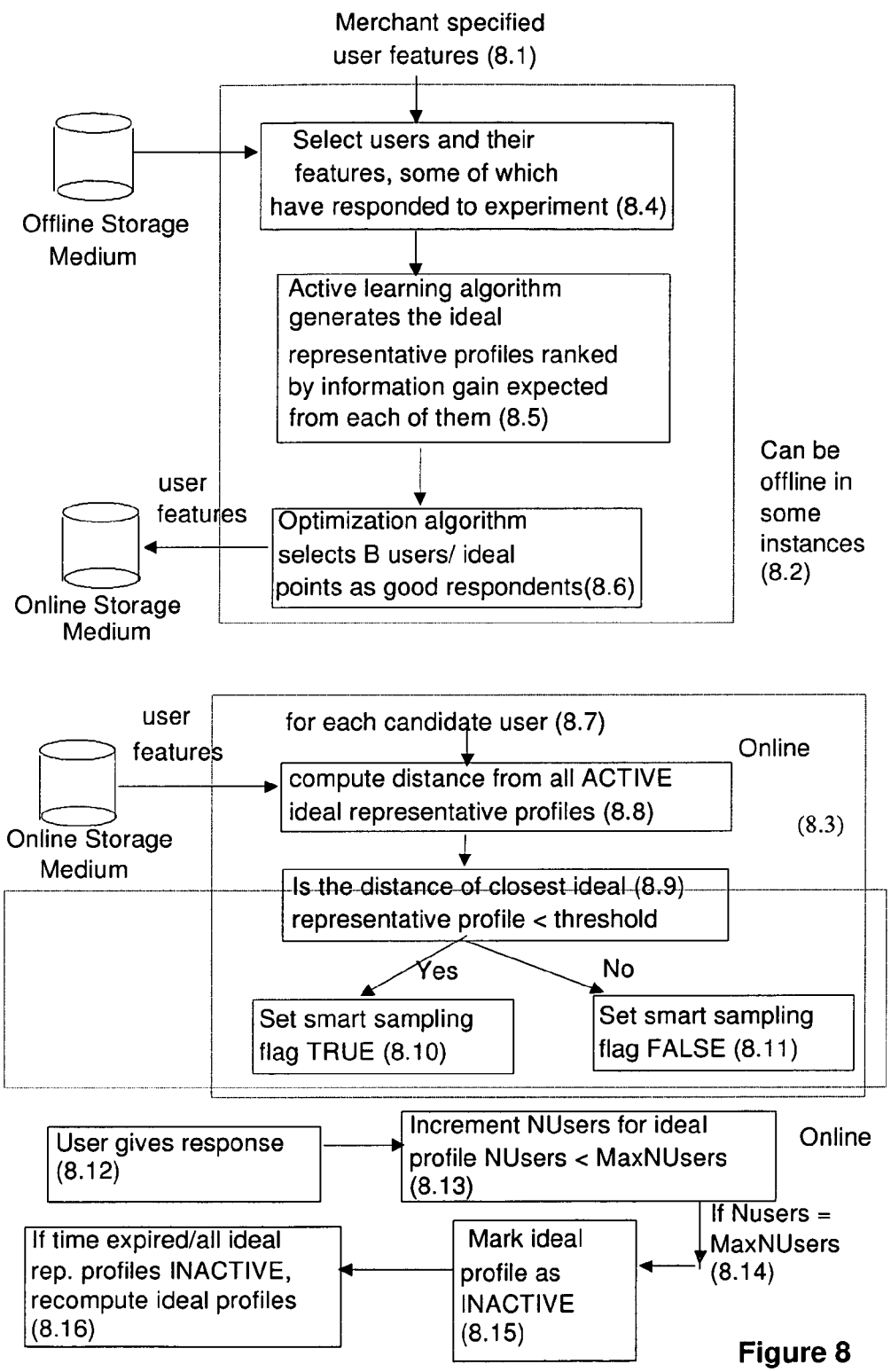
FIG. 8 shows the offline and online components of the smart sampling subsystem.

The smart sampling subsystem as explained in detail in FIG. 8 tries to gain the maximum information from a minimum number of users so as to minimize the cost and the total time required to complete the experiment while the budget subsystem ensures that the experiment is conducted within the merchant's specified budget and dynamically estimates the sample size of users to which the experiment should be offered based on the past user responses, the smart sampling subsystem optimizes the information gained from a sample of that size.

The merchant or the outside agent specifies the user features to compare (8.1). In one instance, the smart sampling subsystem consists of both online (8.3) and offline (8.2) components. The offline smart sampling subsystem selects the ideal representative profiles (as defined by the merchant in Experiment parameters), which provides the maximum expected information gain. The user features of these ideal representative profiles are stored in the Online Storage Medium in form of feature values.

The online smart sampling subsystem (8.3) compares the features of online users (8.7) with the stored features of the ideal representative profiles. It then computes the distance from all ideal representative profiles (8.8) and if the distance of the current online user is within a threshold distance from the ideal representative profiles (8.9), the experiment may be offered to the current user and the online smart sampling subsystem will set its FLAG for the current user to be true. (8.10) else the FLAG is set to false (8.11)

The offline smart sampling subsystem may use one of the well-known active learning algorithms. The merchant defined/selected user features (8.4) in the experiment parameters may serve as inputs to the active learning algorithm (8.5). The merchant may optionally also select a distance metric from a set of predefined distance metrics. The active learning algorithm may take further inputs in the form of the threshold distance, expected arrival rate of users, a spatial distribution of users along the user feature space and the expected response rate of the individual users. The active learning algorithm may be based on Bayesian framework and select ideal representative profiles that will maximize the expected information gain (8.6).

The merchant may do the selection of ideal representative profiles in batches. This means that first a set of ideal representative profiles is selected. Then the system waits to get the response for these ideal representative profiles. Once the offline subsystem gets the response to all the ideal representative profiles, or a specified time limit is exceeded, it incorporates these responses in the sampling for the next batch. This allows the system to dynamically choose the ideal representative profiles.

The online smart sampling subsystem maintains a count for each representative profile for the number of users from which the response has already been collected (8.12, 8.13). In case of presence of controlled or experimental matched groups, a separate count is maintained for each of these groups. Once the number of respondents in each group corresponding to an ideal representative profiles is equal to desired number of points (8.14) the ideal representative profile is made INACTIVE and no user in close proximity of this ideal representative profile is selected thereafter (8.15). The online smart sampling subsystem selects the ACTIVE ideal representative profiles from the list of representative profiles and computes the distance from the current user. Once the specified time period has expired or all the representative profiles are INACTIVE, the system recomputes new ideal profiles (8.16).

Matching Subsystem

Figure 9:
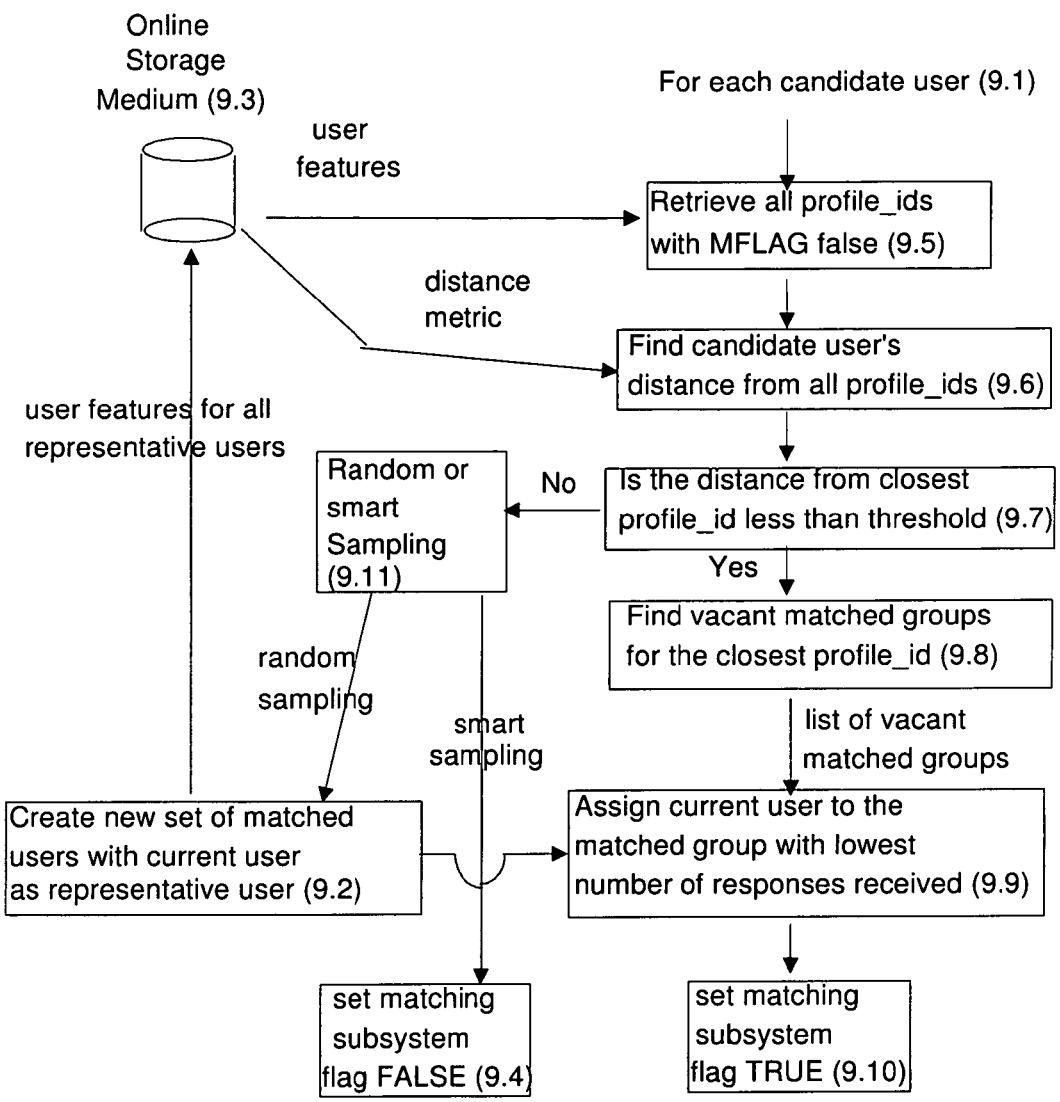
FIG. 9 illustrates the matching subsystem.

The matching subsystem as explained in FIG. 9 ensures that experiment is conducted in a controlled and matched manner i.e. for every user (9.1) who is offered the experiment in the experimental group, the behavior of a similar user in the controlled group is captured. The objective is to compare the effect of a single variable while all other variables are fixed. Besides if the experiment requires more than one values of the marketing variable to be tested together, the matching subsystem also distributes the users across the different experimental groups corresponding to different values. For each user who is offered one value of the marketing variable being tested, a similar user is offered the other value. For example, if the merchant wanted to test three different coupon discount values, there will be three experimental groups, one for each discount value, and one control group, with no discount. So there will be a total of four matched groups. Similarly, the merchant may offer multiple surveys to the controlled group and the experimental group(s). It may also comprise of multiple versions of the same survey to study and remove the bias introduced by the survey methodology. The surveys might differ in sequence of questions, sequence of response options in questions and/or the text description/images displayed for the questions.

Once an experiment is offered to a user in the experimental group, a profile id is created (9.2). The participant's profile, the participant's group i.e. experimental or controlled (in case there are multiple matched experimental groups, the specific experimental group id) and the total number of participants who have been offered the experiment in that group is recorded and stored in an online storage medium (9.3). The profile of the participant needs to be stored as against the participant's user id because the profile is not static. It may change as the participant browses the site further. To ensure complete match, we need to record the profile at the time of offering the experiment. Also, a FLAG is created for each profile id created, which we refer by MFLAG, which is set to FALSE (9.4). MFLAG indicates that there is a vacancy for a user similar to the already sampled at least one of the other matched groups for this profile id. Another user (9.1) who might arrive at a later point in time is compared to the existing profiles with MFLAG as false (9.5). The distance computation may be restricted to representative users belonging to each set of matched users (or ideal representative profiles in case of smart sampling being enabled) for which the MFLAG is false (Table 1). The candidate user's distance from all the profile ids is calculated (9.6). If the new user is within a predefined threshold distance away from any of the existing profiles (9.7), the user is considered similar to that profile id. A set of predefined distance metric is available for the distance computation. The distance computation is completed online. The user is assigned to one of the vacant groups corresponding to the profile id (9.8,9.9). If more than one group is vacant, then the one with the least number of participants may be selected and the corresponding experiment is offered (or none if the group is the controlled group) and matching subsystem flag is set to TRUE (9.10). The number of participants in each group for a particular profile depends on the available budget, number of batches, batch size and the cost associated with each experiment offer.

As an illustration, table 1 describes the assignment of users to the matched groups. For each set of matched users, MFLAG and Representative User are also shown.

TABLE 1

User Assignment table

| S. No. | Controlled group | Experiment Group 1 | Experiment Group 2 | Experiment Group 3 | MFLAG | Representative User |
|---|---|---|---|---|---|---|
| 1 | A | | B | C | False | A |
| 2 | | E | F | | False | E |
| 3 | T | | | | False | T |
| 4 | X | | Y | U | True | X |
| 5 | | | | | | |
| Count | 3 | 1 | 3 | 2 | | |

If the new user is not similar to any existing profile, but has been identified as a good candidate for the experiment (9.11), and if random sampling has been enabled and the budget is available, then a new profile id is created (9.2) for the user and he is assigned to any of the associated groups for that profile. For example, as shown in Table 1, the new user may be assigned to matched group set 5, and experiment group 1. The number of users assigned to experiment group 1 is the lowest at this point in time. Also the first user assigned to a matched group set may be considered as a representative user. In case of smart sampling, MFLAG is set to False (9.4).

For each profile id, the MFLAG is updated whenever a matched user responds to the experiment. There can be a number of experimental groups and only one controlled group for each profile. In such a scenario, MFLAG is set to TRUE when all the matched groups have received the required number of responses from a user similar to the profile id. For example, in case the merchant decides to offer multiple price discounts to customers, say 5%, 10% and 15%. A control group may be created to which no discount is created. In this experiment, one controlled group is used for three experimental groups. The MFLAG would be set TRUE when all the four groups have a matched user (matched group set 4 in Table 1).

There are inherent synergies in implementation of matched group and smart sampling subsystems. Each profile id in a matched group should be close to an ideal representative profile identified by the smart sampling subsystem. This is because the user is identified as a good candidate only if the user is close to at least one of the ideal representative profiles. The ideal representative profile that the user is close to corresponds to the representative user's profile in the matching subsystem. Hence matching subsystem will offer experiments to a set of users for each ideal representative profile or profile id.

There could be several other embodiments for implementing the invention. In one embodiment, the online and offline storage medium could be a single entity especially if the offline sampling subsystem and the offline qualification subsystem is absent.

In another embodiment, the online qualification subsystem may check the offline selection criteria at run-time and the offline qualification subsystem doesn't exist.

In yet another embodiment the merchant can copy an existing experiment. The system may force the merchant to change/re-specify certain parameters while retaining others (which can also be modified). For example, the merchant may have to specify a new name to the experiment. Also, the system may ask the merchant to re-specify the new START and END date and time.

In another embodiment the merchant can modify an existing experiment. The merchant can modify the experiment prior to start time of the experiment. The system may not allow the merchant to modify some of the parameters of the experiment. For example, the merchant may not be allowed to change the experiment name. Some parameters may be allowed to be changed only in certain fashion. For example, the system may not allow a reduction in the allocated budget (or reduction may be allowed but only to the extent unutilized). However, the merchant may be allowed to increase the budget anytime.

In another embodiment for each ideal representative profile, the active learning may specify the number of users to collect the experiment responses from.

In another embodiment the active learning may also be modified to select actual users whose features are already known and the experiment may be offered to these users through e-mail or other communication channels like direct mail, telephone (call centers), chat interfaces, etc.

In yet another embodiment, an outside agent sets the order in which the budget subsystem, the online qualification criterion, the smart sampling subsystem and the matching subsystem are executed.

In another embodiment, an optimization algorithm decides the order in which the budget subsystem, the online qualification criterion, the smart sampling subsystem and the matching subsystem are executed. The relative execution times of each of the subsystems and the relevance of each for the experiment are taken as input and a learning algorithm (for example, reinforcement learning) learns the optimal schedule.

In another embodiment, the offline criteria may be specified only for the registered users as only these users can be identified in an offline mode. For the unregistered users, i.e. users who can not be identified with any previous visits, only online criteria may be specified. Further the online criteria can be used in addition to the offline criteria for the registered users.

In another embodiment, an online version of the offline criteria may also be stored which may check for new users who register after the preselection has been done or a dynamic change in user features which may enable them to be preselected.

In another embodiment, analysis of the user response is available online. In another embodiment, a budget prediction algorithm computes the expected number of redemptions of coupons given the number of coupons acceptance, based on historic redemption rates for different types of product and products categories, at different points in time when the promotion was on for different periods of time and for different time available for redemption.

In another embodiment the merchant may also specify a policy to be used in utilizing the budget.

(a) The total budget available for the study may include the advertising costs and not just, the cost of change in marketing mix. (for example, price reduction through coupons, includes discount given at the time of redemption). (YES/NO)

(b) The system may offer a fixed change in marketing mix variable (for example, a fixed discount) which has a fixed cost x to the y number of customers, such that x*y+advertisement cost of the discounts=budget.

(c) Since a large number of offers (for example, discount/coupon/price reduction offers) may be ignored, this may be modified to x*z+advertisement cost of the discounts=budget, where z is the number of participants who have accepted the offers. The system keeps track of number of acceptances in any point in time and stops offering to other users, once the number of acceptances exceed the budget.

In another embodiment, the merchant defines event-based triggers for deployment, monitoring, intervention and review of experiments. The monitoring is done by defining Event Listeners (as for instance defined in Java API) and the action part of the event listeners could be deployment of the experiment. The merchant can also define event-based triggers to stop the experiment or modify the parameters of the experiment. Besides an event-based control, the merchant can monitor the statistics of the experiment and intervene manually to change the course of the experiment.

In one instance of the preferred embodiment, the smart sampling subsystem computes the information gain of the online users and selects the users, which provide an information gain more than a certain threshold. The threshold may be dynamically determined to attain the required number of respondents in the given time frame. The key inputs to the threshold-determining algorithm include expected arrival rate of users, a spatial distribution of users along the user feature space and the expected response rate of the individual users. A dynamic programming, genetic algorithms, reinforcement learning algorithms can be used for learning the threshold for information gain. Maintaining a number of online classifiers can do the information gain computation and a vote between the classifiers helps select the users with maximum disagreement.

In another embodiment, the budget subsystem uses the time period remaining for the experiment to be completed.

In another embodiment, the smart sampling subsystem uses the time period remaining for the experiment to be completed. If the time remaining is greater than a threshold, it may wait to get the users closer to the ideal representative profiles. Otherwise it may increase the allowed distance of users from the ideal representative profiles.

In another embodiment, the marketing research experiment terminates when the budget has been exhausted or the required size of the selected sample has been reached or the historic or forecasted incremental gain arising from additional sampling has reached a certain threshold limit or the sample size collected so far is expected to reduce the statistical error below a threshold limit.

In another embodiment, the expected information gain from additional respondents may be translated into expected gain in prediction accuracy and the monetary gain equivalent to improvement in the prediction accuracy. The business can compute the value of additional information and compare it with the cost of collecting the additional information from other respondents. The marketing research experiment may thus terminate once the incremental value declines below the cost of information acquisition.

In another embodiment, the merchant specifies the result comparison parameters, whether the result comparison is to be made with historical parameters or with respect to a controlled group. For historical comparison, the merchant specifies the comparable time period.

It will be apparent to those with ordinary skill in the art that the foregoing is merely illustrative and not intended to be exhaustive or limiting, having been presented by way of example only and that various modifications can be made within the scope of the above invention. The present invention can be realized in hardware, software or a combination of hardware and software. The modules as described in the invention could either be realized in a centralized manner, on one computer system could be spread across several interconnected computer systems. Any kind of computer system or other apparatus adapted for carrying out the methods described herein is suited. A typical combination of hardware and software could be a general purpose computer system with a computer program that, when loaded and executed, controls the computer system such that it carries out the methods described herein.

Accordingly, this invention is not to be considered limited to the specific examples chosen for purposes of disclosure, but rather to cover all changes and modifications, which do not constitute departures from the permissible scope of the present invention. The invention is therefore not limited by the description contained herein or by the drawings, but only by the claims.

What is claimed is:

1. A computer-implemented method for conducting controlled online marketing research with budgetary control, said method comprising:
receiving user selection criteria, by a computer, for entry of a user into an online experiment, when said user visits an online site, where said online experiment is conducted;
determining, by said computer, that said user selection criteria, for entry of said user, match user selection criteria for one of a plurality of existing experimental groups and an existing control group stored in said computer system, said user selection criteria comprising:
tracking said user's online browsing to match browsing events;
determining whether said user is a new user or an existing user in one of said plurality of existing experimental groups and said control group;
a number of users for each of said existing plurality of experimental groups and said control group;
an experimental time period for said online experiment; and
a budget for said online experiment, based on probabilistic costs of future user actions implemented by prediction tools;
determining, by said computer, that said user satisfies said user selection criteria for entry into said online experiment, matching said user to a previous participant of said online experiment, assigning said user to one of said plurality of existing experimental groups and said control group, other than that to which said previous participant belongs, entering said user into said online experiment, and conducting said online experiment; and
outputting, by said computer, an analysis of a change in a marketing variable with respect to a response variable given by said user measured during the experimental time period for said online experiment, said marketing variable comprising any of a price of product, a discount, an advertisement, a bundling of products, and a product design or packaging.

2. The method as claimed in claim 1, wherein each ideal representative profile selected for comparison must have at least one vacancy in the experimental or control group(s).

3. The method as claimed in claim 1, wherein the current user is assigned one of the available experimental or control groups such that there is minimal disparity among the relative size of the groups.

4. The method as claimed in claim 1, wherein the number of users assigned to an experiment or control group(s) for a given ideal representative profile is more than or equal to one.

5. The method as claimed in claim 1, wherein the ideal representative profiles are re-computed periodically and steps b(ii), (c), and (d) are repeated for the new set of users.

6. The method as claimed in claim 1, wherein for the remaining time period being less than a threshold, the threshold distance of users from the ideal representative profiles is increased.

7. A computer system for conducting controlled online marketing research with budgetary control, comprising:
a memory that stores user selection criteria for entry of a user into an online experiment; and
a processor that:
determines said user selection criteria, when said user visits on online site where said online experiment is conducted, match user selection criteria for one of an existing plurality of experimental groups and a control group, said user selection criteria comprising:
tracking said user's online browsing to match browsing events;
determining whether said user is a new user or an existing user in one of said existing plurality of experimental groups and said control group;
a number of users for each of said existing plurality of experimental groups and said control group;
an experimental time period for said online experiment; and
a budget for said online experiment, based on probabilistic costs of future user actions implemented by prediction tools;
determines that said user satisfies said user selection criteria for entry into said online experiment, matching said user to a previous participant of said online experiment, assigning said user to one of said existing plurality of experimental groups and said control group, other than that to which said previous participant belongs, entering said user into said online experiment, and conducting said online experiment; and
outputs an analysis of a change in a marketing variable with respect to a response variable given by said user measured during the experimental time period for said online experiment, said marketing variable comprising any of a price of product, a discount, an advertisement, a bundling of products, and a product design or packaging.

8. The system as claimed in claim 7, wherein the representative profile generator is a computer implemented tool.

9. The system as claimed in claim 7, wherein the representative profile generator generates the ideal representative profiles periodically.

10. A non-transitory computer storage device containing computer readable programs code for causing a computer to perform a method for conducting controlled online marketing research with budgetary control, said method comprising:
receiving user selection criteria for entry of a user into an online experiment, when said user visits an online site, where said online experiment is conducted;
determining that said user selection criteria, for entry of said user, match user selection criteria for one of an existing plurality of experimental groups and a control group stored in said computer system, said user selection criteria comprising:
tracking said user's online browsing to match browsing events;
determining whether said user is a new user or an existing user in one of said existing plurality of experimental groups and said control group;
a number of users for each of said existing plurality of experimental groups and said control group;
an experimental time period for said online experiment; and
a budget for said online experiment, based on probabilistic costs of future user actions implemented by prediction tools;
determining that said user satisfies said user selection criteria for entry into said online experiment, matching said user to a previous participant of said online experiment, assigning said user to one of said existing plurality of experimental groups and said control group, other than that to which said previous participant belongs, entering said user into said online experiment, and conducting said online experiment; and
outputting an analysis of a change in a marketing variable with respect to a response variable given by said user measured during the experimental time period for said online experiment, said marketing variable comprising any of a price of product, a discount, an advertisement, a bundling of products, and a product design or packaging.

11. The non-transitory computer program storage device as claimed in claim 10, each ideal representative profile being selected for comparison has at least one vacancy in the experimental or control group(s).

12. The non-transitory computer program storage device as claimed in claim 10, including computer readable program code means configured for assigning the current to one of the available experimental or control groups such that there is minimal disparity among the relative size of the groups.

13. The non-transitory computer program storage device as claimed in claim 10, including computer readable program code means configured for assigning more than 1 user to an experiment or control group(s) for a given ideal representative profile.

14. The computer non-transitory computer program storage device as claimed in claim 10, including computer readable program code means configured for setting the smart sampling parameters includes threshold distance, expected arrival rate of users, a spatial distribution of users along the user feature space and the expected response rate of the individual users as he desired parameters.

15. The non-transitory computer program storage device as claimed in claim 10, including computer readable program code means configured for recomputing the ideal representative profiles periodically and repeating steps (b)11, c, and (d) for the new set of users.

16. The non-transitory computer program storage device as claimed in claim 10, including computer readable program code means configured for dynamically adjusting the smart sampling based on the time period remaining for the experiment to be completed.

* * * * *